US012346725B2

(12) United States Patent
Sun et al.

(10) Patent No.: US 12,346,725 B2
(45) Date of Patent: Jul. 1, 2025

(54) ARTIFICIAL INTELLIGENCE OPTIMIZED CLOUD MIGRATION

(71) Applicant: INTERNATIONAL BUSINESS MACHINES CORPORATION, Armonk, NY (US)

(72) Inventors: Hongtan Sun, Armonk, NY (US); John Rofrano, Mahopac, NY (US); Maja Vukovic, New York, NY (US); Chen Lin, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 957 days.

(21) Appl. No.: 16/919,178

(22) Filed: Jul. 2, 2020

(65) Prior Publication Data

US 2022/0004428 A1   Jan. 6, 2022

(51) Int. Cl.
| | | |
|---|---|---|
| *G06F 9/48* | (2006.01) | |
| *G06F 3/06* | (2006.01) | |
| *G06F 9/54* | (2006.01) | |
| *G06N 5/01* | (2023.01) | |
| *G06N 5/02* | (2023.01) | |
| *G06N 20/00* | (2019.01) | |
| *G06N 5/04* | (2023.01) | |

(52) U.S. Cl.
CPC ............ *G06F 9/4875* (2013.01); *G06F 9/547* (2013.01); *G06N 5/01* (2023.01); *G06N 5/02* (2013.01); *G06N 20/00* (2019.01); *G06F 3/0647* (2013.01); *G06F 2206/1504* (2013.01); *G06N 5/04* (2013.01)

(58) Field of Classification Search
CPC .... G06F 3/0647; G06F 9/5088; G06F 9/5072; G06F 11/3006; G06F 2206/1504; Y04S 50/12; Y10S 707/951
See application file for complete search history.

(56) References Cited

U.S. PATENT DOCUMENTS

| | | | |
|---|---|---|---|
| 9,053,236 B1 * | 6/2015 | Covarrubias | ....... G06F 11/3684 |
| 9,612,765 B2 | 4/2017 | Huang | |
| 9,612,767 B2 | 4/2017 | Huang | |
| 9,710,308 B1 * | 7/2017 | Schwartz | ................ G06F 3/067 |
| 9,892,364 B2 | 2/2018 | Tang | |
| 9,996,562 B2 | 6/2018 | Higginson | |
| 10,728,169 B1 * | 7/2020 | McClenahan | ......... H04L 41/082 |

(Continued)

OTHER PUBLICATIONS

K. Sun and Y. Li, "Effort Estimation in Cloud Migration Process," 2013 IEEE Seventh International Symposium on Service-Oriented System Engineering, San Francisco, CA, USA, 2013, pp. 84-91, doi: 10.1109/SOSE.2013.29. (Year: 2013).*

(Continued)

*Primary Examiner* — Abu Zar Ghaffari
(74) *Attorney, Agent, or Firm* — Heather Johnston

(57) ABSTRACT

An approach to optimized migration of user assets to the cloud using artificial intelligence is presented. This approach may include user input and artificial intelligence trained with historical knowledge to generate rules. Migration models may be generated from the rules. A user may verify the migration models were successful. A task portfolio may be generated from the verified wave migration models. Runbook applications may be generated from the task portfolio and the migration may be executed using the runbooks.

15 Claims, 6 Drawing Sheets

(56) References Cited

U.S. PATENT DOCUMENTS

| | | | |
|---|---|---|---|
| 10,872,029 B1* | 12/2020 | Bawcom | G06F 21/6218 |
| 11,163,614 B1* | 11/2021 | Francisco | G06F 9/5088 |
| 2007/0011669 A1 | 1/2007 | Varma | |
| 2010/0325288 A1* | 12/2010 | Jagadish | G06F 9/54 709/227 |
| 2011/0282982 A1* | 11/2011 | Jain | G06F 9/5094 709/223 |
| 2013/0212200 A1* | 8/2013 | Dennis | H04L 67/1095 709/206 |
| 2014/0115161 A1* | 4/2014 | Agarwal | H04L 41/18 709/226 |
| 2014/0149494 A1* | 5/2014 | Markley | H04W 4/60 709/203 |
| 2014/0344326 A1* | 11/2014 | Kamath | G06F 9/5027 709/203 |
| 2015/0039764 A1* | 2/2015 | Beloglazov | H04L 67/52 709/226 |
| 2015/0248643 A1* | 9/2015 | Nathanson | G06Q 10/103 705/7.28 |
| 2016/0094477 A1* | 3/2016 | Bai | H04L 47/786 709/226 |
| 2016/0357611 A1* | 12/2016 | Sapuram | G06Q 30/0629 |
| 2017/0149687 A1* | 5/2017 | Udupi | H04L 47/83 |
| 2018/0191599 A1* | 7/2018 | Balasubramanian | G06F 9/5072 |
| 2018/0293233 A1* | 10/2018 | Higginson | G06F 16/214 |
| 2018/0330290 A1* | 11/2018 | Mack | G06Q 10/0637 |
| 2019/0182323 A1* | 6/2019 | Srinivasan | G06F 9/5072 |
| 2019/0306236 A1* | 10/2019 | Wiener | G06F 16/24578 |
| 2020/0104367 A1* | 4/2020 | Tagra | G06N 3/045 |
| 2020/0218580 A1* | 7/2020 | Kim | G06F 9/5072 |
| 2020/0287797 A1* | 9/2020 | Firment | H04L 41/22 |
| 2020/0356866 A1* | 11/2020 | Chakrabarty | G06N 20/00 |
| 2020/0379805 A1* | 12/2020 | Porter | G06F 9/5072 |
| 2020/0394063 A1* | 12/2020 | Kelly | G06F 9/452 |
| 2021/0026707 A1* | 1/2021 | Rosenberg | G06F 9/45558 |
| 2021/0065090 A1* | 3/2021 | Chatterjee | G06N 5/01 |
| 2021/0174280 A1* | 6/2021 | Ratnapuri | G06Q 10/06315 |
| 2021/0174289 A1 | 6/2021 | Lo et al. | |

OTHER PUBLICATIONS

J. Alonso, L. Orue-Echevarria, M. Escalante, J. Gorroñogoitia and D. Presenza, "Cloud modernization assessment framework: Analyzing the impact of a potential migration to Cloud," 2013 IEEE 7th International Symposium on the Maintenance and Evolution of Service-Oriented and Cloud-Based Systems, (Year: 2013).*

Disclosed Anonymously, "A method to improve the data migration speed of storage system", IP.com, Aug. 2018, 7 pages, IP.com No. IPCOM000255074D.

Disclosed Anonymously, "An interactive system for the automated workload discovery, visualization and analysis in complex IT environments", IP.com, May 6, 2019, 10 pages, IP.com No. IPCOM000258375D.

Disclosed Anonymously, "Cognitive Migration of workload to Hybrid Cloud", IP.com, Jul. 26, 2018, 6 pages, IP.com No. IPCOM000254733D.

ITU Journal, "The Impact of Artificial Intelligence on Communication Networks and Services", ICT Discoveries, Mar. 2018 [accessed on Feb. 25, 2020], 164 pages, vol. 21, No. 1.

Mell, et al., "The NIST Definition of Cloud Computing", National Institute of Standards and Technology, Special Publication 800-145, Sep. 2011, 7 pages.

Pure1, "AI-Driven Management, Full-Stack Analytics, and Predictive Support", Purestorage, 2018 [accessed on Feb. 25, 2020], 5 pages.

VMWare, "Run Hands-Off and Hassle-Free Production Operations", VMWare, Inc., 2019 [accessed on Feb. 25, 2020], 15 pages, Palo Alto, CA.

* cited by examiner

ARTIFICIAL INTELLIGENCE OPTIMIZED CLOUD MIGRATION

BACKGROUND OF THE INVENTION

The present invention relates generally to cloud migration and more specifically, to optimizing system migration to a cloud using artificial intelligence.

Migrating assets to a cloud can be a costly and labor-intensive task. Many factors must be accounted for in the planning and execution of the migration process. Traditionally, cloud migration planning is accomplished though human planning and individually executing the movements of assets to the cloud.

SUMMARY

Embodiments of the present disclosure include a computer-implemented method, computer program product, and a system for optimizing system migration to a cloud. A processor can generate a wave plan model for a migrating system. The processor can generate a task portfolio for the migrating system based on the wave plan model and a migration action knowledge base. The processor can generate runbooks based on the task portfolio. The processor can migrate the migrating system based on the runbooks.

The above summary is not intended to describe each illustrated embodiment of every implementation of the present disclosure.

Figure 1:
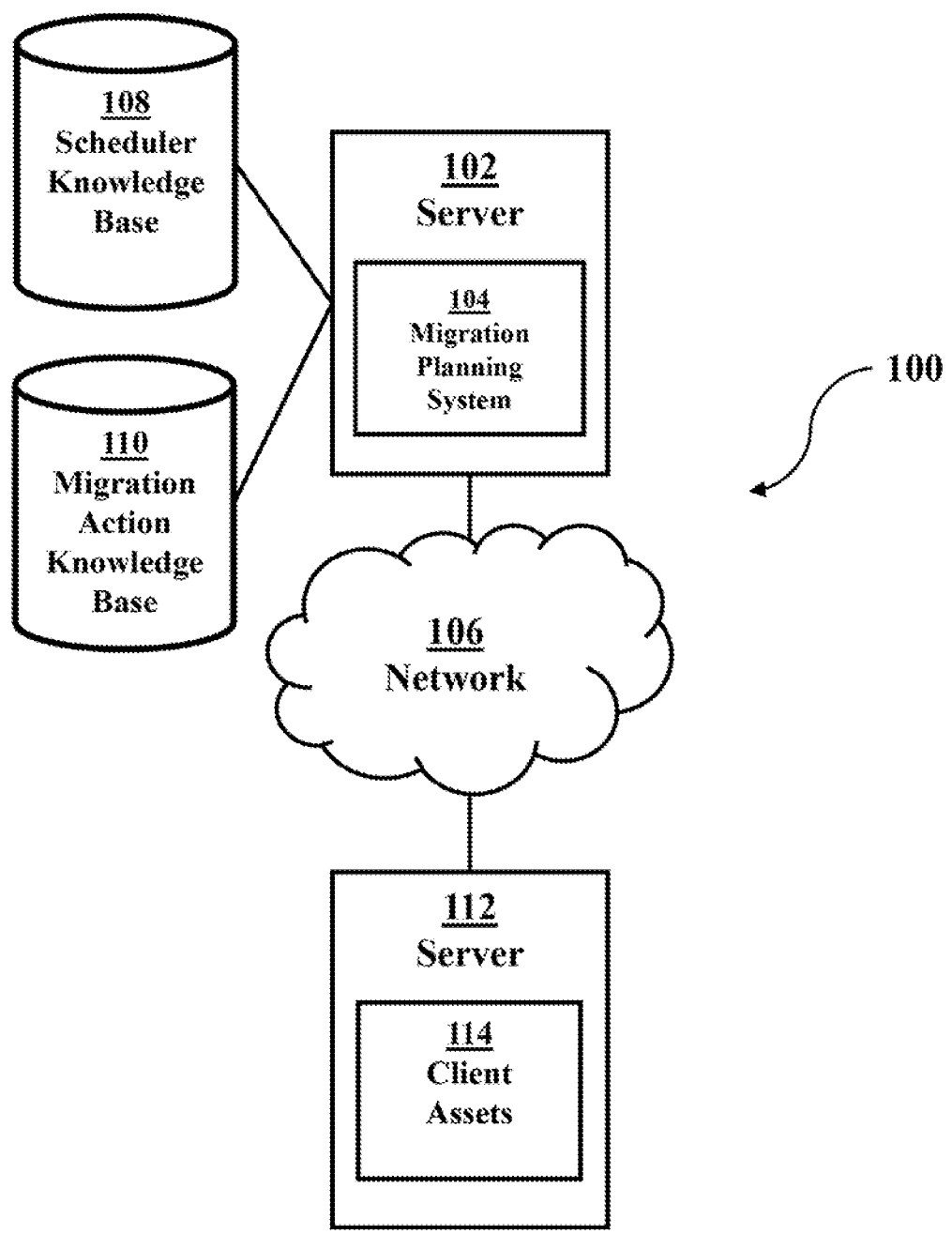
FIG. 1 is a functional block diagram generally depicting an environment for optimizing system migration, in accordance with an embodiment of the present invention.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

The embodiments depicted and described herein recognize the need for optimizing cloud migration planning and execution. Further, optimization can be accomplished using artificial intelligence with capabilities for passive learning and active learning. Embodiments depicted and described herein recognize the benefits of optimizing the process of migrating user assets to the cloud, using an artificial intelligence (AI) model that can actively learn from user input prior to generating a task schedule and passively learn upon successful execution of the AI developed models. The embodiments described herein are capable of automatically migrating user applications and databases from legacy systems to multiple cloud configurations, including software as a service (SaaS), platform as a service (PaaS), and infrastructure as a service (IaaS). Additionally, embodiments are capable of efficiently configuring (e.g. lift and shift, refactoring, partition, etc.) user assets to multiple cloud platforms such as, but not limited to, a private cloud, a public cloud, or a hybrid cloud.

In describing embodiments in detail with reference to the figures, it should be noted that references in the specification to "an embodiment," "other embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, describing a particular feature, structure or characteristic in connection with an embodiment, one skilled in the art has the knowledge to affect such feature, structure or characteristic in connection with other embodiments whether or not explicitly described.

FIG. 1 is a functional block diagram depicting, generally, an environment for optimizing system migration 100. The environment for optimizing system migration 100 comprises a migration planning system (MPS) 104 operational on a server computer 102, scheduler knowledge base (SKB) 108 and migration action knowledge base (MAKB) 110 stored on server computer 102, client assets 114 operational on server computer 112, and network 106 supporting communications between the server computer 102 and the server computer 112.

Server computers 102 and 112 can be a standalone computing device, management server, a web server, a mobile computing device, or any other electronic device or computing system capable of receiving, sending, and processing data. In other embodiments, server computers 102 and 112 can represent a server computing system utilizing multiple computers as a server system. In another embodiment, server computer 102 and 112 can be a laptop computer, a tablet computer, a netbook computer, a personal computer, a desktop computer, or any programmable electronic device capable of communicating with other computing devices (not shown) within the environment for optimizing system migration to the cloud 100 via network 106.

In another embodiment, server computer 102 and 112 represents a computing system utilizing clustered computers and components (e.g., database server computers, application server computers, etc.) that act as a single pool of seamless resources when accessed within environment for optimizing system migration 100. Server computer 102 and 112 can include internal and external hardware components, as depicted and described in further detail with respect to FIG. 4.

MPS 104 can be a module for receiving data inputs, generating optimized migration plans and executing the migrations plans. The data inputs can be associated with the migrating applications, programs, and databases, as well as the target system within an optimized cloud migration environment 100 embodiment. It should be noted, in some embodiments there can be multiple instances of MPS 104 operating on multiple target servers or within a server center. Some embodiments can allow for the user to review the migration task list and verify if it is correct, prior to executing the migration of a user's assets to the target cloud. Additionally, embodiments of the invention can be configured using historical data of past migration projects to ensure efficient and cost-effective migration of a user's assets to a cloud. Further still, some embodiments of MPS 104 can allow for multiple migration models to be generated and executed. A user migrating assets can choose the model which fits best for their needs, for example, it may be the fastest migration, the most cost-efficient migration, or the migration that causes the least business disruptions.

Network 106 can be, for example, a local area network (LAN), a wide area network (WAN) such as the Internet, or a combination of the two, and can include wired, wireless, or fiber optic connections. In general, network 106 can be any combination of connections and protocols that will support communications between server computer 102 and 112.

SKB 108 can be a database that may contain historical data of scheduling and cost optimization. The data can include information associated with the types of systems a user is migrating from or the type of system a user is migrating to. For example, any of the systems may be a Linux based system or a Windows® based system. Further, the applications within the user system or target cloud system may be based on different operating systems, such as Linux, Windows®, Android®, or MacOS®. The data can also be past generated logics or models for executing model migrations. It should be noted, logics are rules which were developed from past migrations. Further, SKB 108 can include technical requirements for user applications and databases migrating to cloud systems, as well as business requirements of user assets including, but not limited to, prioritizing specific business essential applications or essential business databases, from past migration projects.

MAKB 110 can be a database that contains data associated with types of migration tasks and task generation logics or models. Migration tasks can include tasks associated with transferring assets including, but not limited to, asset inventories such as, applications, computer programs, middleware's, servers, virtual machines, containers, network devices, storage devices, load balancer, etc. Additionally, the tasks can be associated with dependencies or affinities, including, but not limited to, operating systems applications are configured to operate on, databases required by specific programs, load balancers on clusters, etc.

Figure 2:
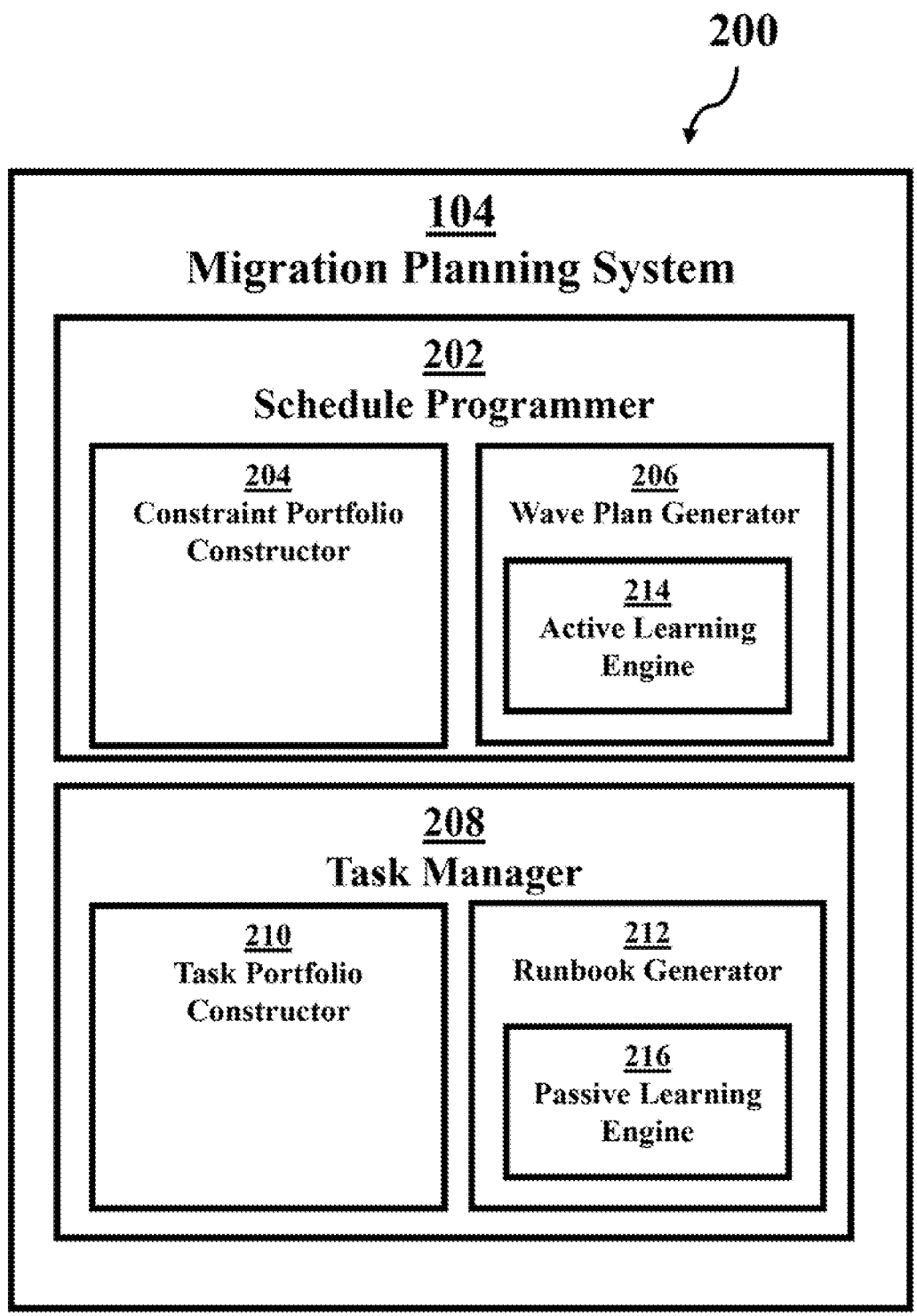
FIG. 2 is a functional block diagram depicting a cloud migration planning system, in accordance with an embodiment of the present invention.

FIG. 2 is a functional block diagram 200 depicting MPS 104 comprising schedule programmer 202 and task manager 208. Constraint portfolio constructor 204 and wave plan generator (WPG) 206 are shown operational on schedule programmer 202. Additionally, active learning engine (ALE) 214 is shown operational on WPG 206. Further, task portfolio constructor 210 and runbook generator 212 are shown operational on task manager 208. Also shown, passive learning engine (PLE) 216 operational on runbook generator 212.

Schedule programmer 202 can be a module that creates optimized wave plan models from data received from a user and APIs, about the migrating systems and SKB 108 (described further below). Additionally, schedule programmer 202 can execute the optimized bundle models. Bundle models can be applications or databases that are required in conjunction to operate properly. For example, a database containing client information or product information may be required to operate a sales program or order tracking software. Further, schedule programmer 202 can include various modules to perform the aforementioned tasks, including constraint portfolio constructor 204 and WPG 206.

Constraint portfolio constructor 204 can be a computer module that can generate a constraint portfolio based on user input, automatic engines (Application Programming Interfaces (API) that scan or monitor assets within the user's original system) and SKB 108 (historical constraints). A constraint portfolio is a set of rules developed using the information from the user, the automatic engines and SKB 108. The user input can contain information about the user assets including inventories (e.g., applications, computer programs, middlewares, servers, virtual machines, containers, network devices, storage devices, load balancers, etc.), dependencies (e.g., which applications requires specific server configurations, the databases a program uses, load balancers assigned to clusters, etc.), and planning rules (e.g., connected assets should be migrated together, non-production instances of applications should be migrated prior to production instances, programs with a common stakeholder should be migrated in the same wave). Constraint portfolio constructor 204 can be preconfigured with data from SKB 108 and the configurations can be updated based on the user input. For example, preconfigured rules can be, but are not limited to, parameter rules (Table 1), affinity rules (Table 2), or relation rules (Table 3).

Rule by Parameter

TABLE 1

| Identity | Parameter Name | Rule Type | Description |
|---|---|---|---|
| Rule 1 | Environment | Priority Sequence | Assets should be prioritized by the given sequence of environment types |
| Rule 2 | Owner | Group | Assets with common stakeholders should be migrated together |
| Rule 3 | Time Window | Range | Some variables should be in a specific range |
| Rule 4 | Target Location | Group | Assets should be migrated together if they have the same target location |
| Rule 5 | Business Importance | Distribute | Critical programs should not be migrated simultaneously or in same wave |

Rule by Relation

TABLE 2

| ID | Relation Name | Rule Type | Description |
|---|---|---|---|
| Rule 1 | Dependency | Group | Assets should be migrated together if one is required for operation of the other |

Further, in some embodiments, rules can be transformed into constraints, using historical knowledge of inventories, dependencies, and planning rules. For example, a rule involving identifying servers within the same affinity group, may be transformed into the following constraint: where the values of decision variables should be the same for assets in the same affinity group. Further, in another example, a rule may involve identifying servers with the same stakeholders may be transformed into the following constraint: add a penalty term to objective function, if servers with the same owner are in different wave (i.e. additional cost is generated). In yet another example, a rule requiring migrating production assets before non-production assets may be transformed into the following constraint: a decision variables value for non-production environments, which turns from one to zero when all production assets have been migrated.

WPG 206 can be a computer module that receives the constraint portfolio generated by constraint portfolio constructor 204 and generates one or more optimized wave plan models based on the constraint portfolio. For example, cost optimization may be calculated with the following equation:

$$d(t)=w_s s(t)+w_m m(t)+w_p p(t)+w_r r(t)$$

where d(t) is the cost optimization function, t is time, s is the cost of subject matter experts (e.g. migration specialists), m is the cost of migration tools (e.g. licenses for migration software, migration network, moving trucks, labor, etc.), p is the cost of any delays in the migration process, r is the risk cost associated with any failed migration and $w_s$, $w_m$ $w_p$, and $w_r$ are assigned weights based on historical data extracted from SKB 108 and/or assigned by a user. In an embodiment, WPG 206 can utilize an optimization engine (e.g. IBM® ILOG CPLEX Optimization Studio) with a constraint optimization model to generate an optimized wave plan.

In an embodiment, WPG 206 can analyze the assets within the user's original system and bundle the assets in waves and create a timetable for the deployment of the waves to the cloud. For example, if the constraint portfolio has a rule about a sales development program that is dependent upon a database and it is a high priority business program, the program may be placed in a wave with the database and migrated over a weekend during night hours, thus creating the least disturbance to business operations. In another example, a low-priority human resources training program with no dependencies may be placed in a wave that will be transferred during business hours, mid-week, allowing resources to be utilized by higher priority items (e.g., inventory tracking programs, financial transaction management programs, or patient management plans) during non-business hours.

In some embodiments, ALE 214 can be operational on WPG 206. If during a migration asset analysis WPG 206 discovers an asset it is unable to identify, WPG 206 can request user input to identify the asset. Upon user input identifying the asset, the SKB 108 can be updated by ALE 214 with the user input.

In an another embodiment, WPG 206 can generate an identification prediction confidence score. An identification confidence score is calculated by WPG 206, by comparing an asset being migrated, to an asset known within SKB 108. For example, SKB 108 may have knowledge of an educational program that teaches Spanish, while the migration asset is an educational program that teaches French. The basic programming may be 95% similar with the different language making the 5% difference. WPG 206 could analyze the programming and determine it is an educational asset with a high confidence score. In another aspect, if WPG 206 is able to identify an asset, but if the identification prediction confidence score does not exceed a predetermined threshold (e.g. 85%), WPG 206 can place the asset within a generated wave plan and a request for user verification of the wave plan can be transmitted to the user. If the user verifies the wave plan, the ALE 214 can update SKB 108 to reflect the correct placement.

Task manager 208 can be a computer module that can create a migration task list (e.g. physical bare metal server transportation), create runbooks based on the migration task list, and execute the runbooks based on the optimized wave plan (explained further below). It should be noted, runbooks are the modules that carry out the migration of client assets 114 to the server. Further, task manager 208 can be include additional computer modules such as, but not limited to, task portfolio constructor 210 and PLE 216 operational on runbook generator 212.

Task manager 208 can have a PLE 216 that is triggered when a user reviews the runbooks generated by runbook generator 212 (described further below) and makes changes to the runbook. PLE 216 recognizes the changes made to the runbooks and can instruct task manager 208 to extract the changes and update MAKB 110 to improve future cloud migrations.

Task portfolio constructor 210 is a computer module that can create a migration task list based on the optimized wave plan model generated by WPG 206, historical knowledge contained in MAKB 110, and user asset information. In an embodiment, optimized wave plan model can contain the timeline in which assets should be migrated, but not the specific tasks associated with migrating the assets. Task portfolio constructor 210 can use the historical knowledge from MAKB 110 to create a task list including, for example, the historical knowledge depicted in Table 3.

Task List

TABLE 3

| ID | Action Name | Object | Description Template | Precedent Rules |
|---|---|---|---|---|
| Action 1 | Shutdown_server | Server | Shutdown server <server_hostname> | Action 2 |
| Action 2 | Shutdown_application | Application | Shutdown application <application_name> | |
| Action 3 | Duplicate_image | Virtual machine (VM), server | Duplicate image for server/VM <server_hostname> | Action 2 |
| Action 4 | Start_server | VM, container | Start VM/container <server_hostname> | Action 3 |
| Action 5 | Start_application | Application | Start application <application_name> | Action 3, Action 4 |

In another example, task portfolio constructor 210 can create a time and date for when to build an image of a container, start the container, stop a container, and destroy a container (e.g. Dockers or Kubernetes). Further, in the case where assets (e.g. a server, hard drive disks, or storage film) are not migrated over a network connection but are physically moved to a data center (e.g. a bare metal server transported by truck or other suitable means), task portfolio constructor 210 can create the time and date schedule for the physical move of the asset.

Runbook generator 212 is a computer module that can create runbooks based on the migration task list. A runbook can be an executable migration instruction application, it can be one application responsible for the entire asset migration or multiple executable asset migration instruction applications. In some embodiments, a user must verify the runbook and execute the runbook. In alternate embodiments, the runbooks can be set to run automatically, when a predetermined time threshold is reached.

In some embodiments, runbook generator 212 can include a PLE 216. PLE 216 is a module that can analyze migration assets against historical assets from MAKB 110, for type of object and the action of the object and determine the best action to take based on the similarities of the object to other known objects. For example, there can be three types of classification as shown in Table 4 below. Upon completion of the classification of unknowns, MAKB 110 can be updated with the information generated from the analysis. Classification

TABLE 4

| Classifier | Status | Action Taken |
| --- | --- | --- |
| Classifier 1 | Action: known<br>Object: unknown | Predict the object type based on the task portfolio assignment for the object |
| Classifier 2 | Action: unknown<br>Object: known | Predict the action based on the object attribute |
| Classifier 3 | Action: unknown<br>Object: unknown | Predict the object type and refer to classifier 2 |

Figure 3:
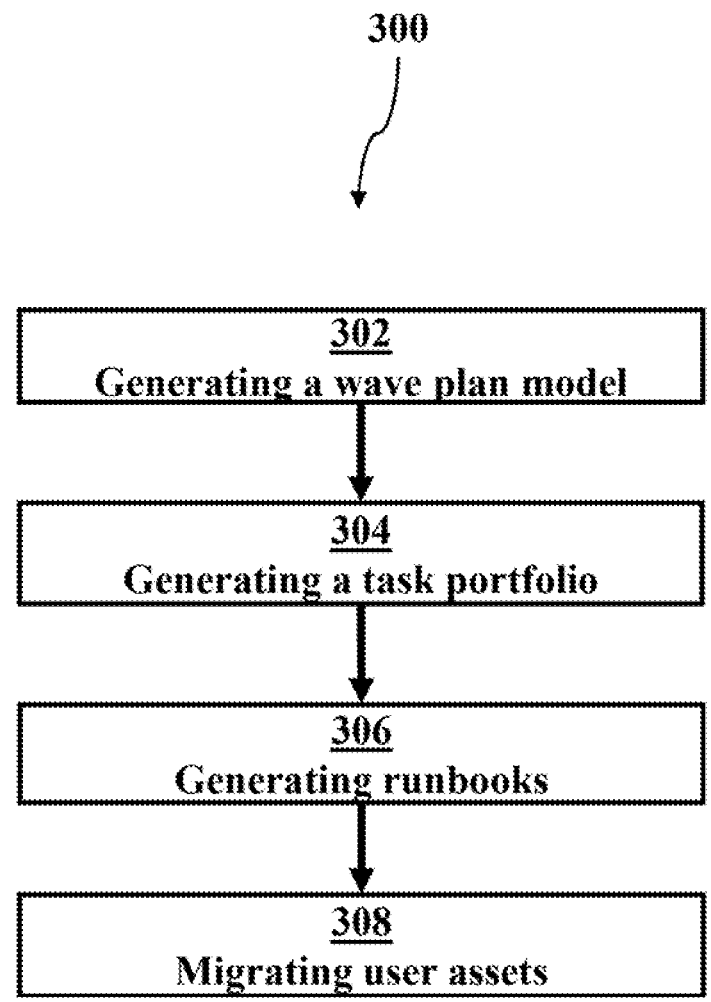
FIG. 3 is a flowchart depicting operational steps of a method for optimized system migration to a cloud, in accordance with an embodiment of the present invention.

FIG. 3 is a flowchart depicting operational steps of a method for artificial intelligence optimized cloud migration 300. At step 302, generating a wave plan model using WPG 206 (as described in above with respect to FIG. 2). For example, in an embodiment a user may input information about the migrating assets and rules associated with the sequence of migrating assets. Additionally, there may be preexisting data regarding similar assets from previous migrations within the SKB 108. The user input information and preexisting data from SKB 108 can be used as constraints and sent to WPG 206. WPG 206 can use the constraints within an optimization program (e.g. IBM® ILOG CPLEX Optimization Studio) to generate the wave plan model.

At step 304, generating a task portfolio, with task portfolio constructor 210, using the historical knowledge from MAKB 110 and the wave plan model generated by WPG 206 (as described in above with respect to FIG. 2). In an embodiment, task portfolio generator 210 receives the wave plan generated by WPG 206 and migration asset information from the user and APIs. With these items task portfolio generator 212 can create the task portfolio, which can be the sequence in which migration assets will be migrated.

Next at step 306, generating runbooks with runbook generator 212 using the task portfolio as a guide (as described above with respect to FIG. 2). In an embodiment, runbook generator 212 receives the task portfolio from task portfolio generator and uses a program such as TopK planner to optimize the runbooks and generate the runbooks.

Next at step 308, migrate the user assets based on the runbooks generated by runbook generator 212 (as described above with respect to FIG. 2). In an embodiment, runbook generator 212 can migrate the user assets. Migrating the assets can involve actions such as uploading the migration assets to a cloud via a network, scheduling bare metal servers to be transported, suspending migration assets within the origin system, and restarting migration assets within the target cloud.

Figure 4:
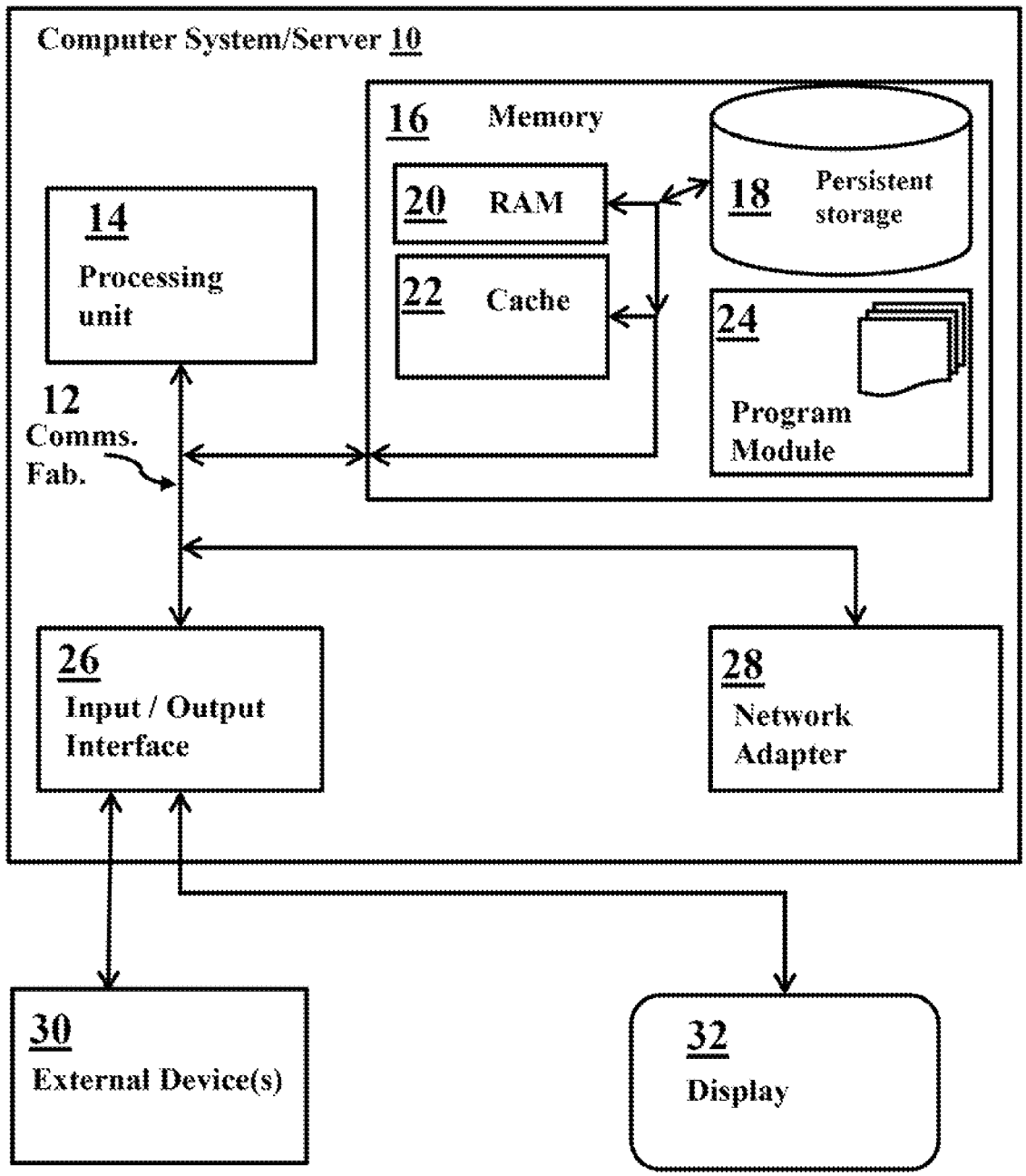
FIG. 4 is a functional block diagram of an exemplary computing system within an artificial intelligence optimized cloud migration environment, suitable for executing a cloud migration planning system, in accordance with an embodiment of the present invention.

FIG. 4 depicts computer system 10, an example computer system representative of a dynamically switching user interface computer 10. Computer system 10 includes communications fabric 12, which provides communications between computer processor(s) 14, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses.

Computer system 10 includes processors 14, cache 22, memory 16, persistent storage 18, network adaptor 28, input/output (I/O) interface(s) 26 and communications fabric 12. Communications fabric 12 provides communications between cache 22, memory 16, persistent storage 18, network adaptor 28, and input/output (I/O) interface(s) 26. Communications fabric 12 can be implemented with any architecture designed for passing data and/or control information between processors (such as microprocessors, communications and network processors, etc.), system memory, peripheral devices, and any other hardware components within a system. For example, communications fabric 12 can be implemented with one or more buses or a crossbar switch.

Memory 16 and persistent storage 18 are computer readable storage media. In this embodiment, memory 16 includes random access memory (RAM). In general, memory 16 can include any suitable volatile or non-volatile computer readable storage media. Cache 22 is a fast memory that enhances the performance of processors 14 by holding recently accessed data, and data near recently accessed data, from memory 16.

Program instructions and data used to practice embodiments of the present invention may be stored in persistent storage 18 and in memory 16 for execution by one or more of the respective processors 14 via cache 22. In an embodiment, persistent storage 18 includes a magnetic hard disk drive. Alternatively, or in addition to a magnetic hard disk drive, persistent storage 18 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 18 may also be removable. For example, a removable hard drive may be used for persistent storage 18. Other examples include optical and magnetic disks, thumb drives, and smart cards that are inserted into a drive for transfer onto another computer readable storage medium that is also part of persistent storage 18.

Network adaptor 28, in these examples, provides for communications with other data processing systems or devices. In these examples, network adaptor 28 includes one or more network interface cards. Network adaptor 28 may provide communications through the use of either or both physical and wireless communications links. Program instructions and data used to practice embodiments of the present invention may be downloaded to persistent storage 18 through network adaptor 28.

I/O interface(s) 26 allows for input and output of data with other devices that may be connected to each computer system. For example, I/O interface 26 may provide a connection to external devices 30 such as a keyboard, keypad, a touch screen, and/or some other suitable input device.

External devices 30 can also include portable computer readable storage media such as, for example, thumb drives, portable optical or magnetic disks, and memory cards. Software and data used to practice embodiments of the present invention can be stored on such portable computer readable storage media and can be loaded onto persistent storage 18 via I/O interface(s) 26. I/O interface(s) 26 also connect to display 32.

Display 32 provides a mechanism to display data to a user and may be, for example, a computer monitor or virtual graphical user interface.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality and operation of possible implementations of systems, methods, and computer program products according to various embodiments of the present invention. In this regard, each block in the flowchart or block diagrams may represent a module, segment or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
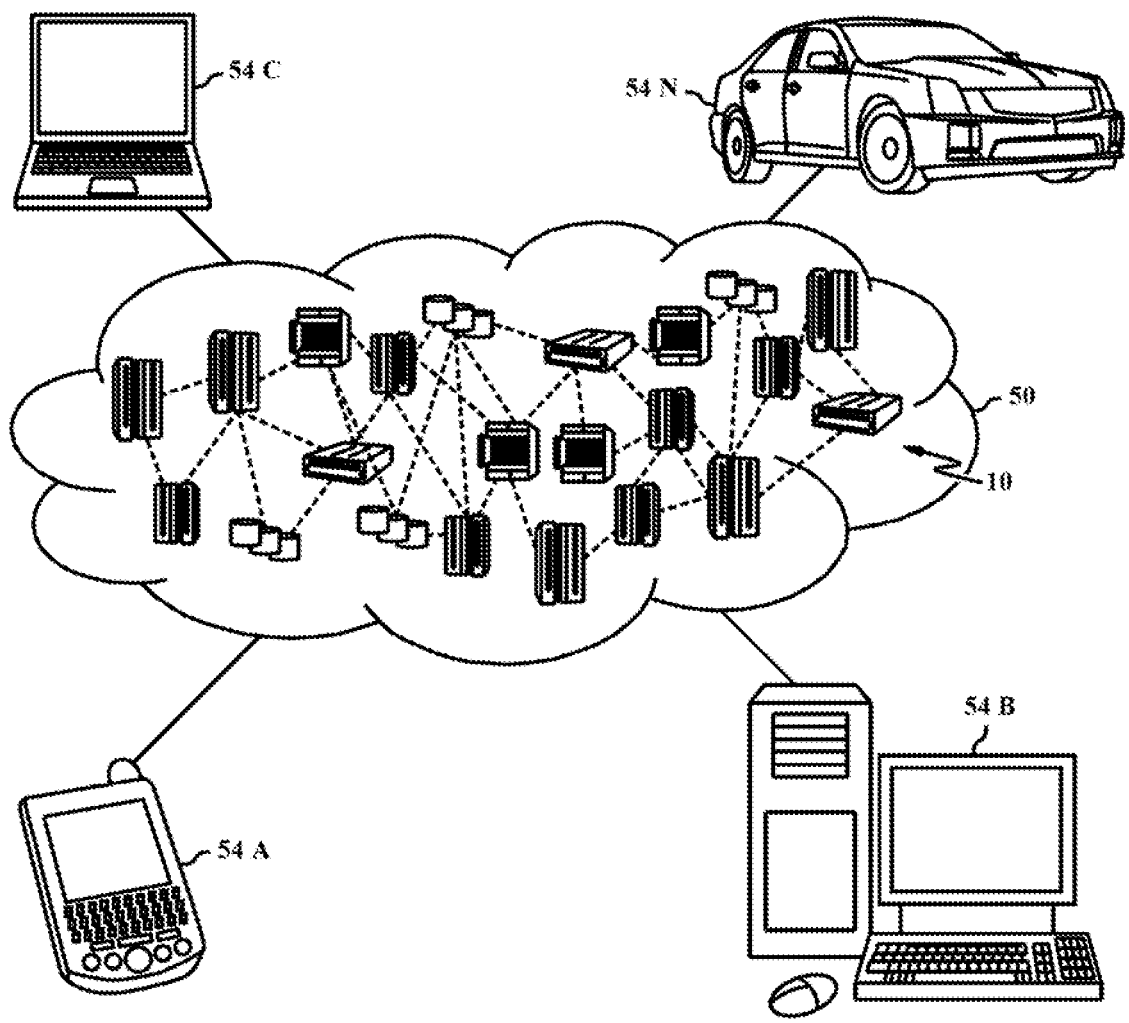
FIG. 5 is a diagram depicting a cloud computing environment, in accordance with an embodiment of the present invention.

FIG. 5 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 6:
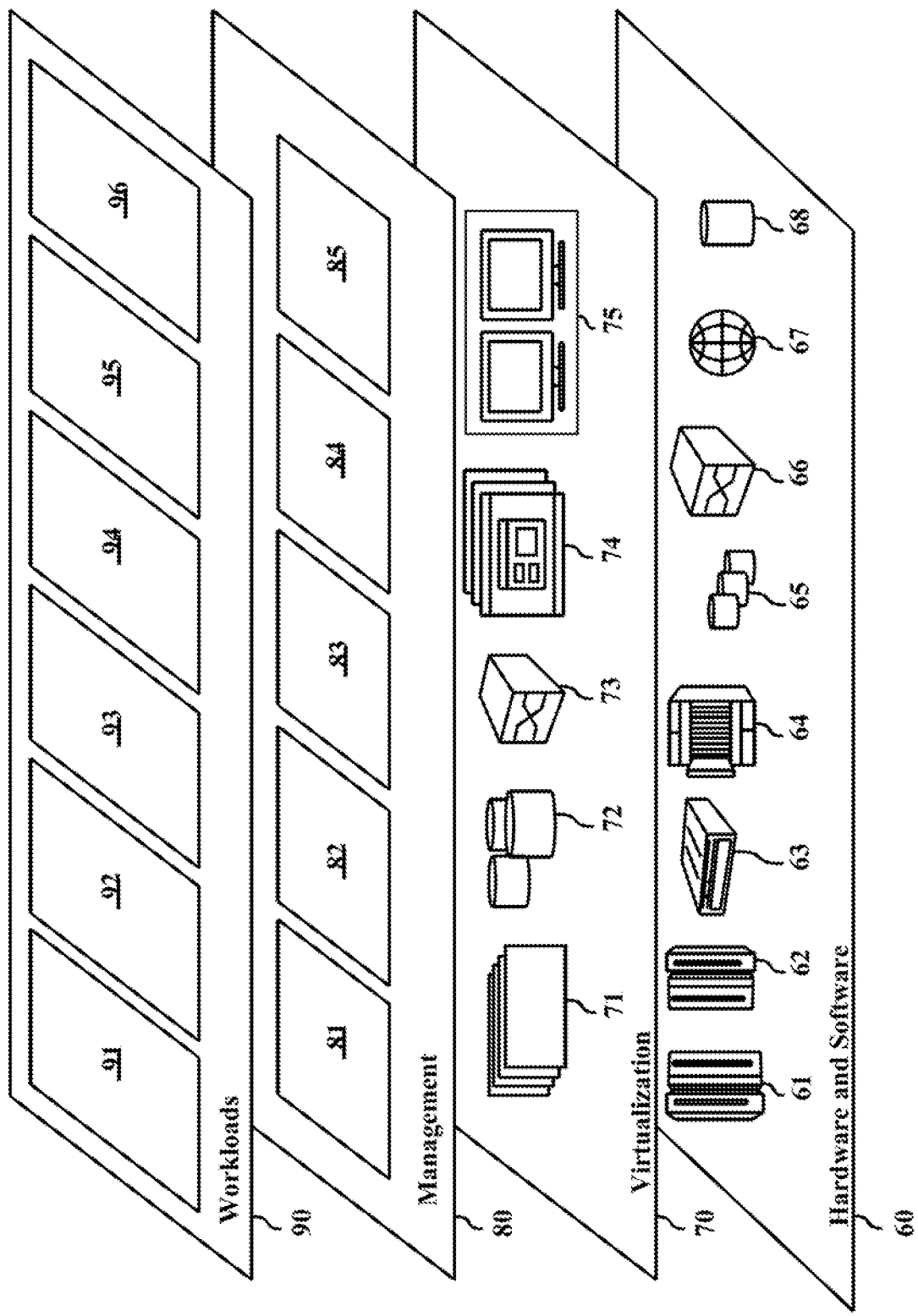
FIG. 6 is a functional block diagram depicting abstraction model layers, in accordance with an embodiment of the present invention.

FIG. 6 is a block diagram depicting a set of functional abstraction model layers provided by cloud computing environment 50 depicted in FIG. 5 in accordance with at least one embodiment of the present invention. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and optimized cloud migration 96.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    receiving a user input associated with a migrating system comprised of a plurality of assets, wherein the user input comprises information regarding an operating system environment of the migrating system and a plurality of dependencies associated with each asset of the plurality of assets, and a physical location associated with each respective asset;
    generating a constraint portfolio, utilizing an artificial intelligence model trained with a plurality of data from a historical scheduler knowledge base and the user input, wherein the constraint portfolio is a set of rules for transferring the migrating system to a cloud computing system;
    generating a wave plan model based on the constraint portfolio and a cost optimization function, wherein the cost optimization function is based on an equation, wherein the equation is:

$$d(t) = w_s s(t) + w_m m(t) + w_p p(t) + w_r r(t)$$

wherein $d(t)$ is the cost optimization function, t is time, s is a subject matter expert cost, $t_s$ is time spent by one or more subject matter experts, m is a migration tools cost, $t_m$ is time using migration tools, p is a migration process delay cost, $t_p$ is migration process delay time, r is a failed migration risk cost, $t_r$ is time spent due to failed migration risk, and $w_s$, $w_m$, $w_p$, and $w_r$ are assigned weights, and wherein the wave plan model is a schedule to transfer each of the assets of the migrating system in one or more bundles to the cloud computing system;
    creating a task portfolio based on the wave plan model, wherein the task portfolio is a date and time dependent schedule for transferring the migrating system to the cloud computing system; and
    generating one or more runbooks based on the task portfolio schedule, wherein the one or more runbooks are executable migration instruction applications.

2. The computer-implemented method of claim 1, further comprising:
    requesting user verification of the task portfolio of whether the task portfolio is acceptable;
    receiving a user confirmation of the task portfolio; and
    executing the one or more runbooks based on the user confirmation of the task portfolio, wherein executing the one or more runbooks transfers the migrating system to the cloud computing system.

3. The computer-implemented method of claim 2, further comprising:
    responsive to user verification of the task portfolio, updating a scheduler knowledge base with the task portfolio.

4. The computer-implemented method of claim 1, wherein the task portfolio comprises a schedule to perform at least one of the following tasks associated with a first asset of the plurality of assets: build an image container, start the container, stop the container, and destroy the container.

5. The computer-implemented method of claim 4, wherein the container is based on Kubernetes container architecture.

6. A computer system comprising:
    a processor;
    a memory;
    one or more computer program instructions stored on the memory for execution by the processor, the program instructions comprising:
    receive a user input associated with a migrating system comprised of a plurality of assets, wherein the user input comprises information regarding an operating system environment of the migrating system and a plurality of dependencies associated with each asset of the plurality of assets, and a physical location associated with each respective asset;

generate a constraint portfolio, utilizing an artificial intelligence model trained with a plurality of data from a historical scheduler knowledge base and the user input, wherein the constraint portfolio is a set of rules for transferring the migrating system to a cloud computing system;

generate a wave plan model based on the constraint portfolio and a cost optimization function, wherein the cost optimization function is based on an equation, wherein the equation is:

$$d(t)=w_s s(t)+w_m m(t)+w_p p(t)+w_r r(t)$$

wherein d(t) is the cost optimization function, t is time, s is a subject matter expert cost, $t_s$ is time spent by one or more subject matter experts, m is a migration tools cost, $t_m$ is time using migration tools, p is a migration process delay cost, $t_p$ is migration process delay time, r is a failed migration risk cost, $t_r$ is time spent due to failed migration risk, and $w_s$, $w_m$, $w_p$, and $w_r$ are assigned weights, and wherein the wave plan model is a schedule to transfer each of the assets of the migrating system in one or more bundles to the cloud computing system;

create a task portfolio based on the wave plan model, wherein the task portfolio is a date and time dependent schedule for transferring the migrating system to the cloud computing system; and generate one or more runbooks based on the task portfolio schedule, wherein the one or more runbooks are executable migration instruction applications.

7. The computer system of claim 6, further comprising program instructions to:

request user verification of the task portfolio of whether the task portfolio is acceptable;

receive a user confirmation of the task portfolio; and execute the one or more runbooks based on the user confirmation of the task portfolio, wherein executing the one or more runbooks transfers the migrating system to the cloud computing system.

8. The computer system of claim 6, wherein the task portfolio comprises a schedule to perform at least one of the following tasks associated with a first asset of the plurality of assets: build an image container, start the container, stop the container, and destroy a container.

9. The computer system of claim 8, wherein the container is based on Kubernetes container architecture.

10. The computer system of claim 8, further comprising program instructions to:

responsive to user verification of the task portfolio, update a scheduler knowledge base with the task portfolio.

11. A computer program product comprising a computer readable storage medium and program instructions stored on the computer readable storage medium, the program instructions comprising:

receive a user input associated with a migrating system comprised of a plurality of assets, wherein the user input comprises information regarding an operating system environment of the migrating system and a plurality of dependencies associated with each asset of the plurality of assets, and a physical location associated with each respective asset;

generate a constraint portfolio, utilizing an artificial intelligence model trained with a plurality of data from a historical scheduler knowledge base and, wherein the constraint portfolio is a set of rules for transferring the migrating system to a cloud computing system;

generate a wave plan model based on the constraint portfolio and a cost optimization function, wherein the cost optimization function is based on an equation, wherein the equation is:

$$d(t)=w_s s(t)+w_m m(t)+w_p p(t)+w_r r(t)$$

wherein d(t) is the cost optimization function, t is time, s is a subject matter expert cost, $t_s$ is time spent by one or more subject matter experts, m is a migration tools cost, $t_m$ is time using migration tools, p is a migration process delay cost, $t_p$ is migration process delay time, r is a failed migration risk cost, $t_r$ is time spent due to failed migration risk, and $w_s$, $w_m$, $w_p$, and $w_r$ are assigned weights, and wherein the wave plan model is a schedule to transfer each of the assets of the migrating system in one or more bundles to the cloud computing system;

create a task portfolio based on the wave plan model, wherein the task portfolio is a date and time dependent schedule for transferring the migrating system to the cloud computing system; and generate one or more runbooks based on the task portfolio schedule, wherein the one or more runbooks are executable migration instruction applications.

12. The computer program product of claim 11, further comprising program instructions to:

request user verification of the task portfolio of whether the task portfolio is acceptable;

receive a user confirmation of the task portfolio; and execute the one or more runbooks based on the user confirmation of the task portfolio, wherein executing the one or more runbooks transfers the migrating system to the cloud computing system.

13. The computer program product of claim 12, further comprising program instructions to:

responsive to user verification of the task portfolio, update a scheduler knowledge base with the task portfolio.

14. The computer program product of claim 11, wherein the task portfolio comprises a schedule to perform at least one of the following tasks associated with a first asset of the plurality of assets: build an image container, start the container, stop the container, and destroy a container.

15. The computer program product of claim 14, wherein the container is based on Kubernetes container architecture.

* * * * *